UNITED STATES PATENT OFFICE.

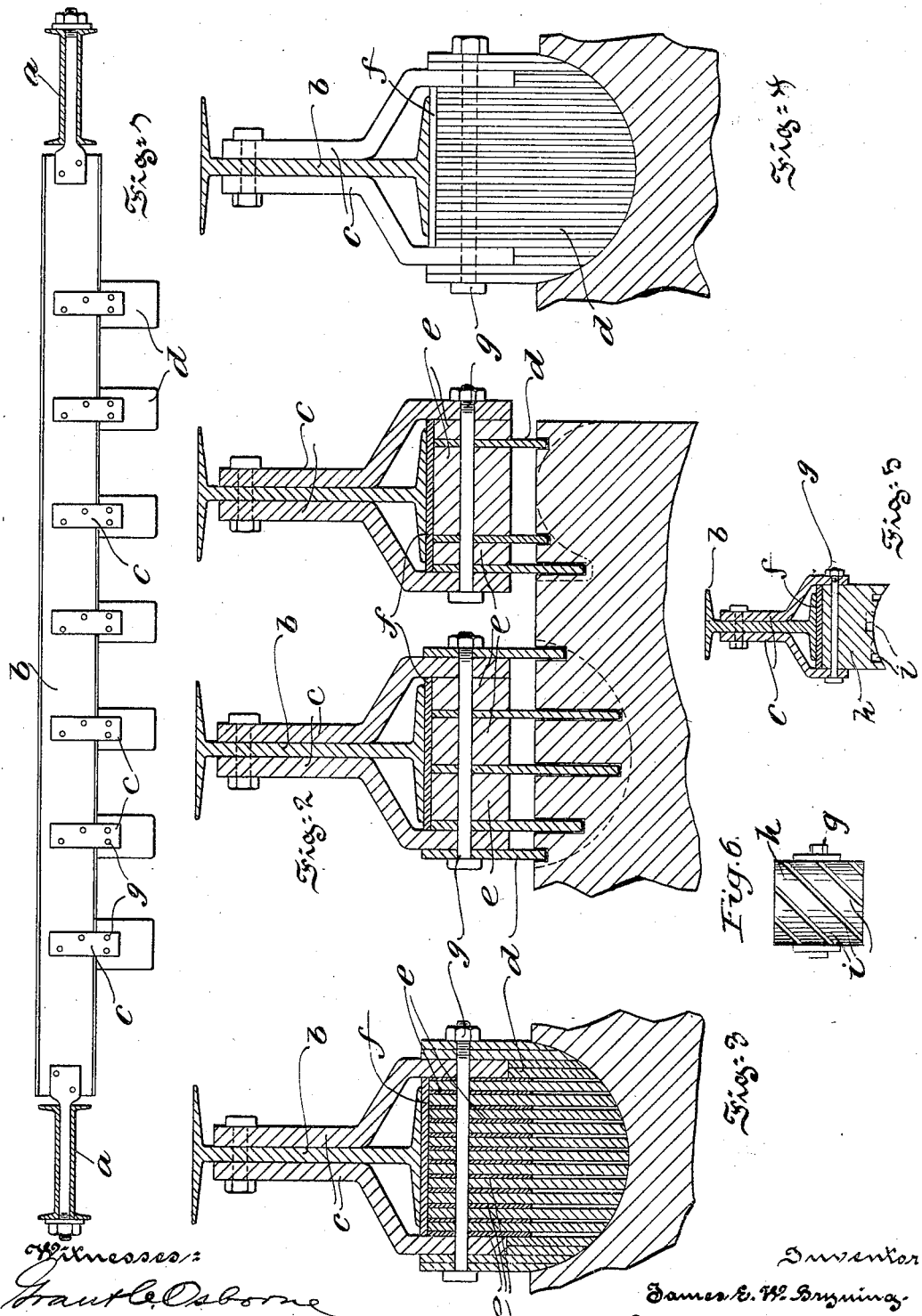

JAMES E. W. BRYNING, OF PHILADELPHIA, PENNSYLVANIA.

GANG-SAW.

No. 806,951.     Specification of Letters Patent.     Patented Dec. 12, 1905.

Application filed August 4, 1905. Serial No. 272,697.

*To all whom it may concern:*

Be it known that I, JAMES E. W. BRYNING, a citizen of the United States, residing at the city of Philadelphia, in the county of Philadelphia and State of Pennsylvania, have invented a certain new and useful Gang-Saw, of which the following is a specification.

Generally speaking, this invention may be termed a saw for the so-called "molding" of stone—such, for instance, as granite, marble, blue-stone, and limestone; and the said invention has for one of its objects the providing of a saw that shall be strong, durable, and comparatively inexpensive to manufacture.

A further object is to provide simple means for adjusting the saw in order that stone may be roughed out, shaped, and finished.

A still further object is to so construct the saw that the operation of which will materially decrease the cost of stone-molding.

The invention consists of the improvements hereinafter described and finally claimed.

The nature, characteristic features, and scope of the invention will be more fully understood from the following description, taken in connection with the accompanying drawings, forming part hereof, and in which—

Figure 1 is a side elevational view, upon a reduced scale, of a saw embodying the invention. Fig. 2 is a central sectional view of a series of saws, illustrating the position of the blades during the weakening or roughing-out stage. Fig. 3 is a similar view of one saw, illustrating the position of the blades during the stage of shaping or molding. Fig. 4 is a sectional view of one of the saws, illustrating the position of the blades during a very fine or finishing stage. Fig. 5 is a similar view of a modified form of the invention, and Fig. 6 is a bottom plan view of Fig. 5.

Referring to the drawings, *a* represents the respective heads of the gang-saw, and suitably carried thereby are beams *b*, I-beams being preferred. Bolted or otherwise secured thereto throughout the length of the beams at suitable distances apart are clamps or jaws *c*. As shown, these jaws straddle the beams and are adapted to support and have depending therefrom a plurality of short blade-sections *d*. The blades may be of various sizes, according to the character of the work to be done. Suitably spaced between the blades there may be wooden separators *e*, and a steel plate *f* may be interposed between the base of the I-beam and the top of the blades. The various described parts are then firmly clamped together by means of bolts *g*. Referring now more particularly to Fig. 2, the saw is equipped to weaken or rough out, as it were, the portions of stone desired to be gotten rid of in molding a stone base. In this connection it will be noticed that the separators *e* are spaced at some distance apart. The stone in its described state is then turned over to a stone-cutter to be hewn out.

As shown in Fig. 3, the blades are shown as being comparatively close together and arranged so as to shape or mold the stone after the stone-cutter has completed his work. If a very fine finish is desired, the separators may be dispensed with entirely, as shown in Fig. 4, and blades used of a small degree of thickness. In this way the blades act in the capacity of a solid block.

In the modified form shown in Fig. 5 a solid block of cast-iron or cast-steel *h* may be used as a finishing-tool, and in such event diagonally-arranged grooves *i* are required in order to permit of the escape of sand or shot used in the operation of the device.

Having thus described the nature and objects of the invention, what I claim as new, and desire to secure by Letters Patent, is—

1. In combination a gang-saw and its complemental heads of a beam carried thereby, clamps secured to the beam and a plurality of blade-sections supported by and depending from said clamps, substantially as described.

2. In combination a gang-saw and its complemental heads of a beam carried thereby, clamps secured to the beam, a plurality of blade-sections supported by and depending from said clamps, and separators interposed between said blades, substantially as described.

3. In combination a gang-saw and its complemental heads of an I-beam carried thereby, a series of clamps secured to the beam, a plurality of short blade-sections supported by and depending from said clamps and separators interposed between said blades, substantially as described.

4. The combination of a gang-saw and its heads of an I-beam carried thereby, a series of clamps secured throughout the length of said beam, a plurality of short blade-sections supported by and depending from each clamp, separators interposed between the blades, and a plate between the beam and blades, substantially as described.

In testimony whereof I have hereunto set my hand and seal this 1st day of August, 1905.

JAMES E. W. BRYNING. [L. S.]

In presence of—
 W. J. JACKSON,
 HENRY B. TAWRESEY.